United States Patent [19]

Conolly

[11] Patent Number: 4,673,124

[45] Date of Patent: Jun. 16, 1987

[54] METHOD FOR ELIMINATING, OR MINIMIZING THE EFFECTS OF, DEFECTS IN MATERIALS

[75] Inventor: Ralph I. Conolly, Bristol, England

[73] Assignee: Rolls-Royce plc, London, England

[21] Appl. No.: 883,704

[22] Filed: Jul. 9, 1986

Related U.S. Application Data

[63] Continuation of Ser. No. 550,558, Nov. 10, 1983, Pat. No. 4,628,008.

[30] Foreign Application Priority Data

Nov. 16, 1982 [GB] United Kingdom ................. 8232721

[51] Int. Cl.$^4$ ........................ B23K 20/22; B23K 20/14
[52] U.S. Cl. .................................. 228/170; 228/176; 228/190; 228/193; 228/243; 428/940
[58] Field of Search ............... 228/190, 170, 176, 193, 228/243; 428/940

[56] References Cited

U.S. PATENT DOCUMENTS

| | | | |
|---|---|---|---|
| 158,578 | 1/1875 | Durfee | 228/190 |
| 248,748 | 10/1881 | Howell | 228/190 X |
| 3,550,254 | 12/1970 | Greenspan et al. | 228/193 X |
| 3,670,397 | 6/1972 | Lewis | 228/190 X |
| 3,927,952 | 12/1975 | Kirby | 416/229 A X |
| 4,472,866 | 9/1984 | Moracz et al. | 228/190 X |
| 4,479,293 | 10/1984 | Miller et al. | 416/241 R |
| 4,485,961 | 12/1984 | Ekbom et al. | 228/193 |
| 4,493,452 | 1/1985 | Fastner et al. | 228/176 X |

FOREIGN PATENT DOCUMENTS 750054 6/1956 United Kingdom .
1364793 8/1974 United Kingdom .

OTHER PUBLICATIONS

P. Wildgoose, et al. "Powder Metallurgical Innovations for Improved Hot-Section Alloys in Aero-Engine Applications", Powder Metallurgy, 1981.

Primary Examiner—Kenneth J. Ramsey
Attorney, Agent, or Firm—Parkhurst & Oliff

[57] ABSTRACT

A method is described for the manufacture of articles in defect-immunized materials in which the defects are eliminated, or broken up and oriented in such manner as to minimize their harmful effects on the article.

Referring to FIG. 1e, a rotor disc for a gas turbine engine is formed to an approximate shape by stacking together "sticks" 5 of material in an evacuated container and bonding them together by a hot isostatic pressing process. The "sticks" 5 are produced by extruding a starting body, for example, of powder material, to produce an elongation of up to twenty times and then cutting them to the appropriate length. By this means any non-metallic inclusions in the powder are broken up, inspection of the sticks and rejection of defective ones becomes easier, and the sticks can be oriented so that the effects of any remaining defects can be minimized.

14 Claims, 11 Drawing Figures

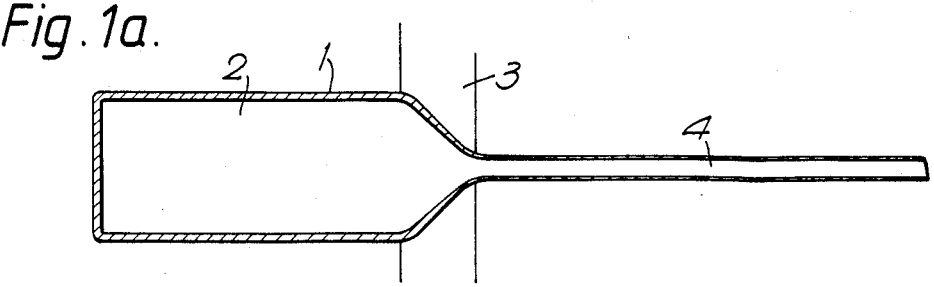
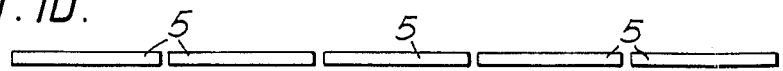
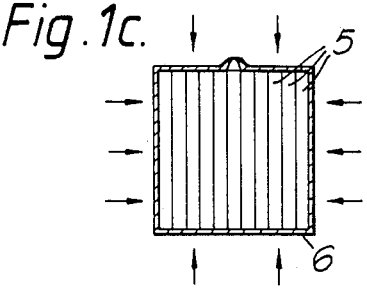 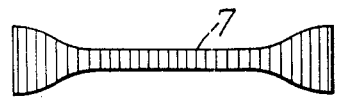
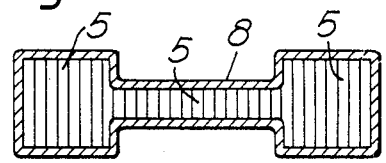
 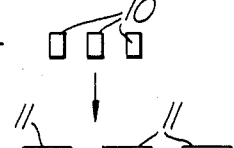 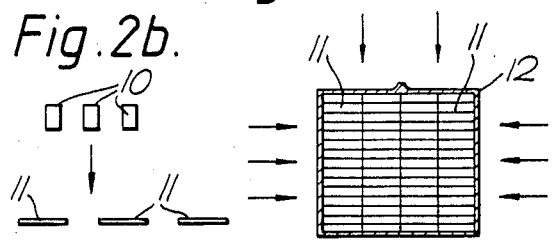
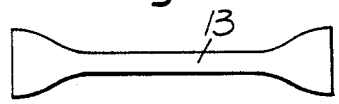

METHOD FOR ELIMINATING, OR MINIMIZING THE EFFECTS OF, DEFECTS IN MATERIALS

This is a continuation of application Ser. No. 550,558, filed Nov. 10, 1983, now U.S. Pat. No. 4,628,008.

The present invention relates to a method for eliminating, or minimizing the harmful effects of, defects in materials, but includes materials when made by the method, and articles when made from the material.

Harmful defects arise in current materials in the forms of porosity, non-metallic inclusions, and chemical segregation which causes undesirable phases or structures in the material. These defects can cause failure in components which are subjected to high stress in use, for example, turbine or compressor rotor discs of gas turbine engines.

Ideally, such components should be made from defect-free materials, but up to now we know of no method by which materials are made which can guarantee total elimination of such defects as referred to above.

One process, known as hot isostatic pressing, has been used for eliminating or reducing porosity in case material, and for compacting and bonding metal powder into biltets with minimum porosity, but the problem of inclusions has not yet been completely solved.

Our research has indicated that the harmful effects on components of non-metallic inclusions in the material from which they are made can be significantly reduced if the inclusions are reduced in size, or are reduced in cross-sectional area in one or more planes, and we have devised a process for achieving this end, which process also provides the opportunity for better inspection of the material during its manufacture, which could result in an entirely defect-free material.

Throughout this specification we shall refer to a "defect immunized material" which is hereby defined as a material which is entirely free of the defects of porosity or non-metallic inclusions, or in which any remaining such defects are so reduced in size, or are so reduced in cross-sectional area in one or more planes, that their harmful effects on components made from the material are reduced to an acceptable level.

One object of the present invention is to provide a method for the manufacture of a defect immunized material, as hereinbefore defined, or of an article made from such a material.

Another problem which is presently becoming more acute in the production of forged rotor discs for gas turbine engines is the provision of a fine grain size. Large grain sizes lead to difficulty in ultrasonic inspection, low mechanical properties, and, with the latest high strength materials which are difficult to forge, a greater tendency towards cracking. It has long been recognized that a production technique for controlling the micro-structure of forged materials is beneficial.

In one of the conventional ways of making a forged turbine or compressor rotor disc from a cast ingot, a first step in the process of manufacture is to work the material, either by extrusion of the ingot to smaller diameter or by a coarse forging process. If the final forged disc is relatively large, however, there is little scope for working the material to improve its grain size unless the size of the initial ingot is increased to such an extent as to require enormous forces, and hence very large presses, in order to effect the necessary deformation.

Another object of the present invention is to provide a method for the manufacture of a defect-immunized material as hereinbefore defined and having a pre-determined micro-structure.

Another object of the present invention is to provide a method of manufacture of an article with a controlled grain structure and in which a defect-immunized material is produced as an intermediate step, the article being formed from the material so produced. The article referred to may be a billet for the production of a component, or the component itself.

According to the present invention a method for the manufacture of an article in a defect-immunised material as hereinbefore defined comprising the steps of:

subjecting an initial body of material to a working process which imparts a high degree of plastic deformation thereto to produce an upset ratio of at least 5:1, along at least one principal axis of the body, cutting the defromed body into a plurality of smaller pieces, stacking at least some of the smaller pieces in a sealable container, either with or without additional pieces, evacuating the container, and, bonding all of the pieces together using a hot isostatic pressing technique.

Preferably the method includes the further step of inspecting the smaller pieces for any detectable defects and rejecting pieces having any, or any unacceptable defects therein.

The deformation of the initial body provided by the working process may be arranged to reduce any of its dimensions by the desired amount, thereby increasing others, but is preferably used to increase the length of the billet to a greater extent than its width is increased. In this way it is possible to spread any inclusions within the material to an extent such that they break up into much smaller pieces, or are reduced in cross-sectional area in one or more planes sufficiently to have no detrimental effect on the material properties in that plane.

Thus in a preferred embodiment of the invention, the degree of deformation is such that the billet is elongated by a factor of at least five times and preferably by a factor of ten to fifteen times.

The deformation may be carried out by extrusion, rolling, drawing, forging, pressing or any similar process, or by a combination of one or more such processes.

The minimum deformation may be achieved in one or more steps, not including the step of cutting the deformed billet into smaller pieces, and is to be taken as having been achieved if an upset ratio of 5:1 is achieved along any of the original principal axes of the starting body at any intermediate stage of working, even if the dimension along this axis is subsequently changed.

The initial body of material may be formed from cast material or a powder material which may, or may not be, in its fully densified form, or built up by spraying or welding.

The final step of bonding the smaller pieces together by hot isostatic pressing may be used to produce a reconstituted billet of a suitable shape for forging into the desired article, or may, by using a suitably shaped "can", result in formation of the article itself in an approximate shape.

The bonded article may be bigger than the initial starting body by the addition of further pieces to be container prior to bonding.

Since the hot isostatic pressing technique will additionally tend to compress the article and close any porosity therein, defects due to this cause will also be eliminated or significantly reduced in size.

In order to put further work into the material and thus to further break up any inclusions, and to further refine the grain size, the smaller pieces cut from the deformed billet may be pressed into flat discs prior to being stacked together and bonded. The effect of this is to flatten the inclusions into the plane of each disc, so that when formed into the shape of a rotor disc, any remaining inclusions will be aligned generally with the plane of the disc so that their effects will be minimized. It also provides still smaller pieces which are more easily inspected and less costly to discard if faulty.

The smaller pieces, or flattened discs, may form only part of a final article which may include any combination of such pieces and discs, together with other shaped pieces of the same or different materials to make up a composite article.

The invention will now be more particularly described, by way of example only, and with reference to the accompanying drawings in which:

FIGS. 1a to 1e show diagrammatically the steps in one method by which the invention is applied to the manufacture of a disc for a gas turbine engine.

FIGS. 2a to 2d show the steps in an alternative method according to the invention for the manufacture of a rotor disc for a gas turbine engine.

Figure 3:
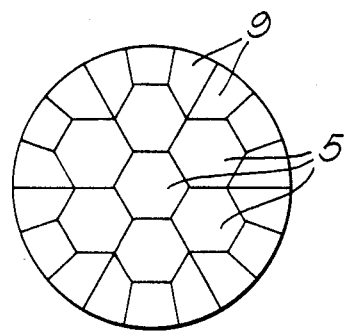
FIG. 3 illustrates a composite gas turbine engine rotor disc made in accordance with the invention, and, FIG. 4 illustrates a still further example of a rotor disc made in accordance with the invention.

Referring now to the Figures, FIG. 1a illustrates a metal container known as a "can" full of a metal powder preparatory to heating and consolidating as would be the case in a conventional hot isostatic pressing operation. However, instead of consolidating the powder into a finished billet, the high temperature and pressure is used to extrude the powder through a die 3 to a relatively small diameter rod 4, for example 1.0 inch in diameter. This gives a very large extrusion ratio, for example up to 20:1 depending on the original can size, putting a lot of work into the material and elongating any non-metallic inclusions which have escaped detection during the powder making process. The extrusion ratio is determined not only with a view to breaking up the non-metallic inclusions to a size at which they represent no serious threat to the integrity of the finished component, but also with the object of achieving an optimum cross-sectional area for inspection purposes, and with a view to achieving a high degree of grain refining. The extension process may be carried out in more than one step.

At this stage the elongate rod can be easily dressed and inspected and surface defects removed.

In the next stage the rod is cut into appropriate shorter lengths ("sticks") 5 for making a billet (FIG. 1b). The "sticks" can now be easily inspected for serious internal defects by ultrasonic or other non-destructive tesing techniques, and any "sticks" containing unacceptable defects can be discarded at this stage. The "sticks" which form minor components of a larger article are then assembled in a suitable "can" 6 of large billet size, which is evacuated and subjected to hot isostatic pressure to bond the "sticks" into a billet as illustrated in FIG. 1c. This billet and any component made therefrom has been immunized to a much greater extent than hitherto against the harmful effects of defects in the original powder body.

When fully consolidated and bonded, the billet is removed from the "can" and may be forged into a single large rotor disc, or cut into smaller sizes and forged into small rotor discs 7. (FIG. 1d).

Hot isostatic pressing is a well-known process at this time and, therefore, no specific details are given. Suffice it to say that depending on the materials involved, the bonding is effected by encapsulating the minor components in a metal, ceramic or glass can, evacuating the can and subjecting it to an external pressure in the order of 20 atmospheres and a temperature in excess of 1000° C.

To improve the stacking and bonding of the "sticks" and to provide flat surfaces which are preferable for ultrasonic inspection, they may be initially extruded to square, hexagonal or other cross-section.

To cut costs it may be possible to cut out the forging operation by consolidating and bonding the "sticks" to the appropriate shape and size during the hot isostatic pressing process. This becomes more feasible if the "sticks" are cut to varying lengths prior to consolidation, and the assembled "sticks" 5 are made to conform as closely as possible to the finished size and shape of the disc as shown in FIG. 1e, where the "sticks" 5 are shown assembled in an appropriately shaped "can" 8.

The extrusion process will elongate any defects along the longitudinal axes of the "sticks" so that they will be oriented axially of the rotor disc. This may not be the optimum orientation for a rotor disc in which the main stresses are radial and circumferential. The following description of FIGS. 2a and 2d relates to an extension of the process of the invention which gives the opportunity of further immunizing the rotor disc against the harmful effects of inclusions, not only by making them still smaller, but also by providing the opportunity to orientate them within the disc in a manner which produces the minimum harmful effect in the plane of the principal stress axis of the disc.

FIG. 2a shows a number of "sticks" 5 produced from a powder as described with reference to FIGS. 1a and 1b above. These "sticks" are then sliced to produce mini-billets 10, as shown in FIG. 2b and then stamped, or forged, to flatten them into mini-discs 11 about 1.0 inch thick. This process further works the material to break down any inclusions and produces smaller, more easily inspectable minor components which can be discarded if not acceptable. The inclusion-free mini-discs can then be assembled in an evacuated can 12, as shown in FIG. 2c, and consolidated by hot isostatic pressure to form a billet, or can be assembled into a "can" in the shape of a near-to-size large component, which is evacuated, the mini-discs finally consolidated and bonded together by hot isostatic pressure to form a defect-immunized component which requires minimal machining. The final component 13 is shown in FIG. 2d.

Any inclusions remaining undetected in a mini-disc will be flattened into the plane of the mini-disc and will be oriented with its maximum surface area normal to the axial direction of the finished rotor disc, which is the least harmful orientation.

That is, the defects will be oriented so they are elongated generally parallel to the plane of the finished rotor disc.

Although the above methods have been described starting from a powder material, this is not essential, and the concept of providing a defect-immunized major component formed at least in part by consolidating an assembly of pre-worked and inspected minor components is not limited, since any form of rods, blocks rings or discs can be assembled and bonded by the hot isostatic process.

A further significant benefit of the above described method is that it opens up the possibility of making hybrid components, with different properties in different parts of the component which are subject to different operating conditions. This can be achieved by producing a different micro-structure in different "sticks" by applying different amounts of work thereto, or by using "sticks" of different materials altogether.

Thus, for example, as shown in FIG. 3, a turbine disc may be assembled from minor components such as cast blocks at the rim giving good control over their grain size for creep resistance, and wrought "sticks" of defect immunized material at the bore. Some of the "sticks" may be made from a still further material to provide high fatigue strength for providing bolt holes for connection to further components.

In another disc (not shown) the materials may be chosen to provide high creep resistance at the rim, high tensile strength at the bore and a weldable intermediate zone. It is even possible for certain of the minor components to be made from a ceramic material if necessary. In this type of hybrid component construction, a further possibility is that residual stress in the component may be controlled by using materials of different thermal expansion characteristics near the bore and the rim of the disc.

Figure 4:
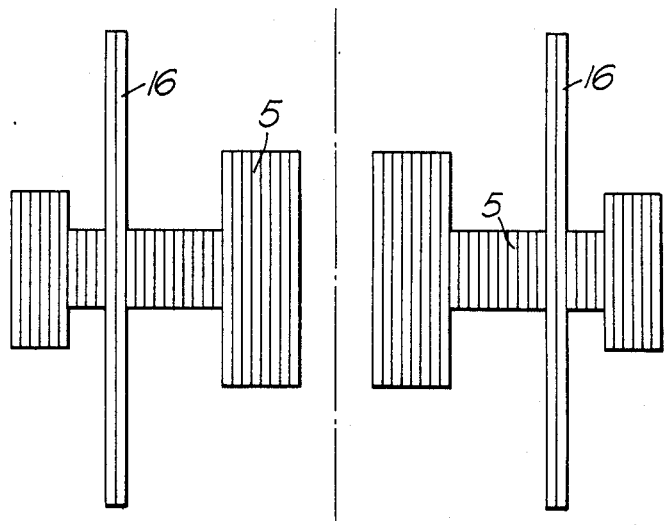

In a still further alternative of the concept shown in FIG. 4, a portion of a shaft 16 can be formed integrally with the rotor disc by inserting a solid ring, or a ring of longer sticks of appropriate material, into the container and packing the "sticks" 5 or other minor components around it, so that it becomes bonded to the other minor components during the hot isostatic pressing process.

The possibility of obtaining very high upset ratios in the material before re-constituting it into a new article, e.g. a billet or near-to-size component, has the benefit that the resulting very fine grain structure of the new article makes it easier to work and easier to inspect. Both these factors can result in a lowering of the cost of the process. Additionally, the super fine grain structure may allow the opportunity for super plastic forming of the article.

Many other possibilities can be envisaged for making components with desirable properties hitherto no achievable. For example, each "stick" may be a composite of shorter sticks of different materials giving the opportunity to vary the disc properties in an axial direction.

Additionally, the "sticks" may be bent to provide the correct grain flow around changes of cross-section.

Articles other than gas turbine engine rotor discs could, of course, benefit from the defect-immunization of the present invention.

I claim:

1. A method for the manufacture of an article in a defect-immunized material comprising the steps of:
  subjecting at least one initial body of material to a working process which imparts a high degree of plastic deformation thereto to produce an upset ratio of at least 5:1 along at least one principal axis of the body, thereby elongating defects in the initial body along said at least one principal axis,
  cutting the deformed at least one body into a plurality of smaller pieces,
  stacking at least some of the smaller pieces in a sealable container with said stacked smaller pieces arranged so that said elongated defects therein are oriented in a predetermined direction with respect to the direction of stress to be applied to the article of manufacture, the predetermined direction being selected so as to minimize adverse effects of said elongated defects on said article,
  evacuating the container, and
  bonding all of the pieces in the container together using a hot isostatic pressing technique to form the article.

2. A method as claimed in claim 1 further comprising a step of inspecting the smaller pieces for any detectable defects and rejecting pieces having, any unacceptable defects therein, prior to the stacking and bonding steps.

3. A method as claimed in claim 1 and in which the deformation is carried out by extrusion to elonage the initial body to at least 5 times its original length.

4. A method as claimed in claim 3 and in which the initial body is elongated to between ten and twenty times its original length.

5. A method as claimed in claim 3 and in which the initial body is a billet of powder material.

6. A method as claimed in claim 1 and in which the article is a billet from which a shaped component is subsequently formed.

7. A method as claimed in claim 1 and in which the article is a shaped component formed directly during the hot isostatic pressing process.

8. A method as claimed in claim 1 and in which further pieces of different material from the initial body are stacked in the container with said smaller pieces, whereby the article formed by the bonding step has a composite material structure.

9. A method as claimed in claim 1 and in which further pieces having a different microstructure from said smaller pieces are stacked in the container with said smaller pieces, whereby the article formed by the bonding step has a varying micro-structure.

10. An article as made by the method claimed in claim 1.

11. An article as claimed in claim 10 and which comprises a rotor disc for a gas turbine engine.

12. A method as claimed in claim 1, wherein the smaller pieces are arranged, during said stacking step, so that said elongated defects therein are oriented with their maximum surface areas generally parallel to the direction of the applied stress.

13. A method for the manufacture of a rotor disc for a gas turbine engine in a defect-immunized material comprising the steps of:
  subjecting at least one initial body of material to a working process which imparts a high degree of plastic deformation thereto to produce an upset ratio of at least 5:1 along at least one principal axis of the body, thereby elongating defects in the initial body along said at least one principal axis,
  cutting the deformed at least one body into a plurality of smaller pieces,
  stacking at least some of the smaller pieces in a sealable container with said stacked smaller pieces arranged so that said elongated defects therein are oriented in a predetermined direction with respect to the direction of stress to be applied to the rotor disc, the predetermined direction being selected so as to minimize adverse effects of said elongated defects on said rotor disc,
evacuating the container, and
bonding all the pieces in the container together using a hot isostatic pressing technique to form the rotor disc.

14. A method as claimed in claim 13, wherein the smaller pieces are arranged, during said stacking step, so that said elongated defects therein are oriented with their maximum surface areas generally normal to the axial direction of the rotor disc.

* * * * *